United States Patent [19]

Breslin et al.

[11] 4,238,689
[45] Dec. 9, 1980

[54] VACUUM CLEANER CONTROL SYSTEM

[75] Inventors: John J. Breslin, Los Altos Hills; David K. Lee, San Jose, both of Calif.

[73] Assignee: Beamco Co., Inc., Mountain View, Calif.

[21] Appl. No.: 16,018

[22] Filed: Feb. 28, 1979

[51] Int. Cl.³ .............................................. H02J 3/00
[52] U.S. Cl. .................................. 307/42; 307/252 B; 307/139
[58] Field of Search .................. 307/22, 38–38 M, 307/42, 85, 139, 140, 154, 11, 12, 18, 112, 113, 114, 115, 116, 149, 252 B, 311

[56] References Cited

U.S. PATENT DOCUMENTS

| 4,016,428 | 4/1977 | Gutterman | 307/116 |
| 4,070,586 | 1/1978 | Breslin | 307/22 |

OTHER PUBLICATIONS

Application Note, General Electric, 200.35,3–66, Using the Triac for Control of AC Power, J. H. Galloway pp. 1–19.

IBM Technical Disclosure Bulletin, vol. 8 No. 8, Jan. 1966, p. 1168 Memory Heater Control by M. J. Clark.

*Primary Examiner*—L. T. Hix
*Assistant Examiner*—S. D. Schreyer
*Attorney, Agent, or Firm*—Naylor, Neal & Uilkema

[57] ABSTRACT

A vacuum cleaner power and control system wherein a single pair of conductors is employed to transmit electrical power to a remote motor driven agitator and to selectively energize the blower motor of the cleaner. Photo electric means is employed to sense current flow in the conductors and trigger the power switch for the blower in response to the sensing of such flow. A switch includes a load capacitor which may be selectively connected between the conductors to establish current flow therethrough without activating the remote motor driven agitator. In one embodiment, the power supply for the agitator motor is separate from that of the blower and a sensor is provided in the vicinity at which the agitator is connected to sense the supply of power thereto and activate the blower in response to such supply.

3 Claims, 3 Drawing Figures

VACUUM CLEANER CONTROL SYSTEM

BACKGROUND OF THE INVENTION

The present invention relates to an improved control system for central and portable vacuum cleaners of the type having a vacuum blower motor and remote agitator motor. In its more particular aspects, the invention is concerned with such a system wherein a single pair of conductors may be employed to both supply power to the remote agitator motor and energize the blower motor.

This invention is an improvement in the invention forming the subject of U.S. Pat. No. 4,070,586, granted Jan. 24, 1978 to John J. Breslin, one of the coinventors herein. That patent discloses a control system wherein power is supplied and control is achieved through means of a single pair of leads. In the system of that patent, energization of the blower motor was achieved by either a transformer sensing system or the monitoring of the voltage drop in a D.C. circuit.

Another patent significant to the present invention is U.S. Pat. No. 3,525,876, Aug. 25, 1970, also granted to John J. Breslin. That patent discloses a two wire power transmission and control circuit which supplies low voltage D.C. power to an agitator motor and which uses a low voltage A.C. circuit.

The present invention is a simplification of the A.C. control and power supply circuit found in U.S. Pat. No. 4,070,586. It is an improvement over the circuit of that patent in that it results in economy of parts and labor, decreased size and weight and the avoidance of inadvertent triggering of the blower motor as the result of current leakage across the parallel wires extending to the control switch for the agitator and blower motors. Such leakage is a significant factor because of the length of the leads and may be sensed by the sensing transformer, with the result that the transformer turns on the main blower, even though the control switch is in full "off" position. This type of leakage is known as "capacitive reactance".

SUMMARY OF THE INVENTION

In the broadest aspects, the present invention is concerned with a control system wherein a single conductor pair is employed to supply power to a remote load device and energize a central load device by energizing a switch in the power supply circuit for the central load device in response to the sensing of current flow in the single conductor pair. The invention is particularly concerned with an improved circuit wherein photo electric means is interposed in one of the conductors of the pair for energization in response to current flow therein and means couples the photo electric means to the switch in the power supply circuit to close the switch in response to energization of the photo electric means.

The invention is also concerned with such a system wherein separate power supplies may be provided for the remote and central load devices and the photo electric means is disposed in the vicinity of the remote device to sense the flow of current thereto. In another aspect, the invention is concerned with an improved switch wherein capacitive load may be selectively connected across the conductor pair for the remote load device to shunt current flow through the conductor pair, without activating the remote device.

A principal object of the present invention is to provide a simplified circuit for employing a single pair of conductors to provide power to a remote load device and selectively energize a central load device.

Another object of the invention is to provide such a circuit which is not subject to erroneous triggering of the central load device as the result of current leakage between the conductors.

Still another object of the invention is to provide such a circuit in which the components are very compact and, thus, ideally suited for employment in portable vacuum cleaner systems wherein space is very limited.

A further object of the invention is to provide such a circuit wherein the central and remote load devices are supplied with power from separate power supply outlets and a separate low voltage circuit is provided to sense current flow in the supply leads for the remote device and energize the supply leads for the central device in response to such sensing.

Another object related to the latter object is to provide such a separate circuit wherein Class 2 wiring (i.e., low voltage-low cost) wiring may be used.

The foregoing and other objects will become more apparent when viewed in light of the following detail description and accompanying drawings.

DESCRIPTION OF THE PREFERRED EMBODIMENTS

Figure 1:
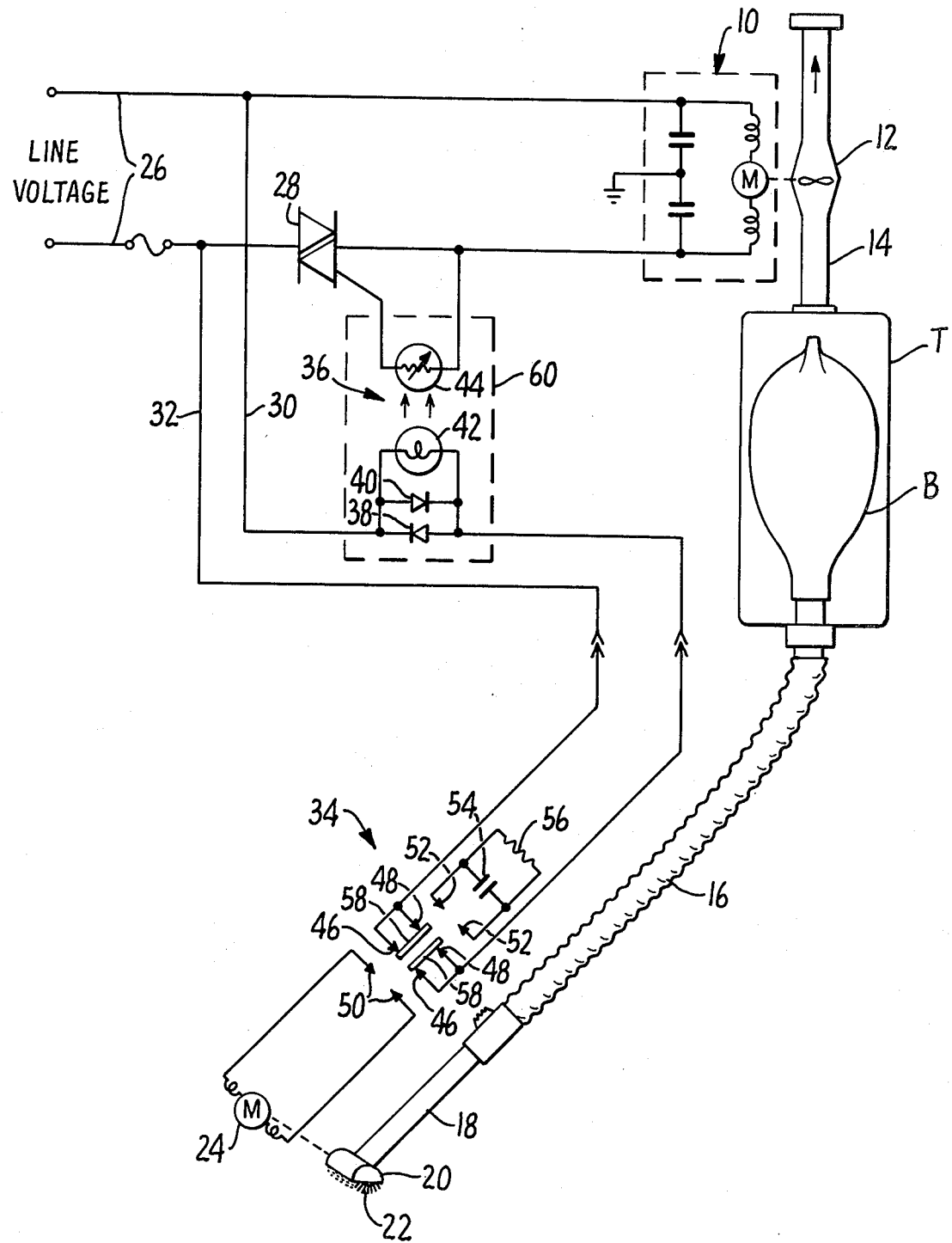
FIG. 1 is a diagrammatic representation of a portable vacuum cleaning device, with the elements of the electrical control system schematically illustrated.

Referring now to FIG. 1, the A.C. suction motor is designated therein by the numeral 10 and is shown coupled to an air turbine 12 in the vacuum airway 14 of a portable vacuum cleaner. The airway 14 communicates with a tank T having an air permeable bag B suspended therein, which bag has a flexible hose 16 releasably connected thereto. The hose 16 is connected to a cleaning wand 18 having, at its lower end, a nozzle 20 containing a rotary brush 22 driven by an agitator motor 24.

Power input lines 26 provide A.C. line voltage to both the suction motor 10 and the agitator motor 24. The lines 26 lead directly to the motor 10, with a triac switch 28 being interposed in one of the lines. Power is supplied from the input lines 26 to the agitator motor 24 by a pair of conductors 30, 32. A three-position double pole switch 34 is interposed in the conductors 30, 32 and photo sensing means 36 is connected to the lead 30 to sense current flow therethrough. The photo sensing means comprises: a pair of oppositely directed load diodes 38, 40 connected in parallel with one another and series connected in the conductor 30; an electric light 42 connected in parallel with the diodes; a photo cell 44 disposed in light intercepting relationship relative to the light 42, said photo cell being connected between the gate terminal of the triac switch 28 and the line 26 in which the triac is located so that the current generated by the photo cell in response to the interception of light from the light 42 functions to gate the triac switch and, thus, close the power circuit to the suction motor 10.

The switch 34 comprises: first and second pairs of central contacts 46 and 48, respectively, connected to the conductors 30 and 32; a pair of agitator motor contacts 50; a pair of shunt contacts 52; a load capacitor 54 series connected between the contacts 52; a discharge resistor 56 connected in parallel with the capacitor 54; and, a pair of slide contacts 58. As shown in FIG. 1, the slide contacts 58 are in their central position wherein they contact the contacts 46 and 48 and function to completely interrupt the flow of current through the conductors 30 and 32. Movement of the slide contacts downwardly to the left, as viewed in FIG. 1, functions to connect the contacts 46 and 50 and, thus, complete the circuit to the agitator motor 24. Movement of the slide contacts upwardly to the right, as viewed in FIG. 1, functions to connect the contacts 48 and 52 and, thus, complete the load through the capacitor 54 and, thus, shunt current around the agitator motor 24, while completing the circuit through the conduits 30 and 32.

In operation, the operator wishing to energize the A.C. suction motor 10 without the agitator motor 24, merely slides the slide contacts 58 so that the load capacitor 54 completes the circuit across the conductors 30 and 32. Current then flows through the capacitor 54 and the load diodes 38 and 40, thus creating a voltage drop across the diodes and energizing the electric light 42. Energization of the light 42 functions to close the triac switch 28 through operation of the photo cell 44. When the operator wishes to activate the brush 22 he merely slides the contacts 58 to the position to provide A.C. power to the agitator motor 24, so that current is again drawn through the photo sensing means 36 to close the triac switch 28 and, thus, also energize the suction motor 10.

The dashed line in FIG. 1 depicts a printed circuit board 60 on which the photo electric means, including the diodes 38 and 40, the light 42 and the photo cell 44, together with the wiring therefor, is mounted. In actual practice, this circuit board and the components thereon are miniaturized and may cover a total area of about one square inch and have a thickness of less than a quarter inch.

Figure 2:
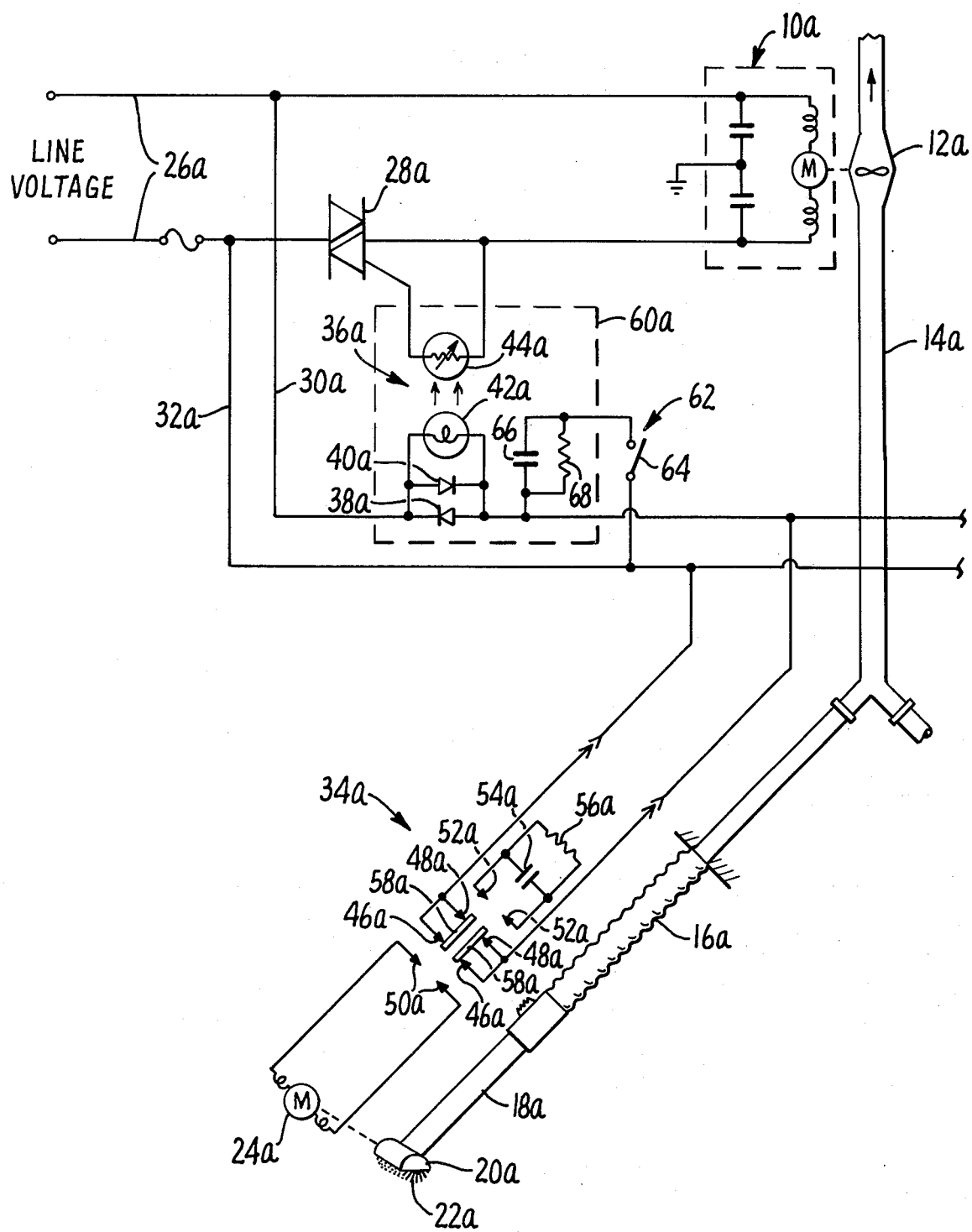
FIG. 2 is a diagrammatic representation of a central vacuum cleaning system, with the elements of the electrical control system schematically illustrated.

FIG. 2 illustrates a central vacuum cleaning system having circuitry essentially the same as that of the portable system of FIG. 1, with the exception that the FIG. 2 circuit employs an additional bypass switching circuit in parallel with the switch at the remote cleaning wand location. The vacuum system of FIG. 2 also differs from that of FIG. 1 in that the A.C. suction motor and the air turbine are permanently installed at a central location and the vacuum conduit leading therefrom extends to a plurality of remote locations, as is typical in central vacuum cleaner systems. Although not illustrated in FIG. 1, it should be understood that suitable filtering means would be incorporated into the vacuum airway leading to the air turbine.

Because of the similarity of the FIGS. 1 and 2 vacuum cleaning systems and associated circuitry, elements of FIG. 2 corresponding to those of FIG. 1 are designated by like numerals, followed by the subscript "a", as follows: A.C. suction motor 10a; air turbine 12a; vacuum airway 14a; flexible hose 16a; cleaning wand 18a; nozzle 20a; brush 22a; agitator motor 24a; power input lines 26a; triac switch 28a; conductors 30a and 32a; switch 34a; photo sensing means 36a; load diodes 38a and 40a; electric light 42a; photo cell 44a; contacts 46a, 48a, 50a and 52a; load capacitor 54a; discharge resistor 56a; slide contacts 58a; and printed circuit board 60a.

The bypass switch circuit of FIG. 2 is coupled between the conductors 30a and 32a at the location of the photo sensing means 36a. In the preferred embodiment, this location would be close to the central location at which the suction motor 10a and air turbine 12a are located. The purpose of the bypass switch circuitry, designated in its entirety by the numeral 62 is to enable the suction motor 10a to be turned on without the necessity of turning on the motor through the remote switch 34a. This feature is intended primarily for service purposes when it is desired to test the motor 10a.

The circuitry 62 is similar to the shunting circuitry incorporated into the switch 32a and comprises: a switch 64 connected at one side to the conductor 32a; a parallel connected load capacitor 66 and discharge resistor 68 connected at one side to the switch 64 and at the other side to the conductor 38.

The operation of the FIG. 2 circuit from the remote location of the switch 34a is identical to that of the FIG. 1 circuit. Thus, through the switch 34a, the motors 10a and 24a may be selectively activated or deactivated. During such operation of the switch 34a, the switch 64 is maintained in an open condition.

To operate the bypass circuitry 62, it is simply necessary to close the switch 64, thus connecting the load capacitor 66 across the conductors 30a and 32a. The latter condition creates a current flow condition in the conductors and, thus, energizes the motor 10a through means of the photo sensing means 36a and triac switch 28a. In the preferred embodiment illustrated, the capacitor 66 and resistor 68 and the leads therefor are mounted on the printed circuit board 60a. Switch 64 may be located at any position convenient to service personnel for the motor 10a.

Figure 3:
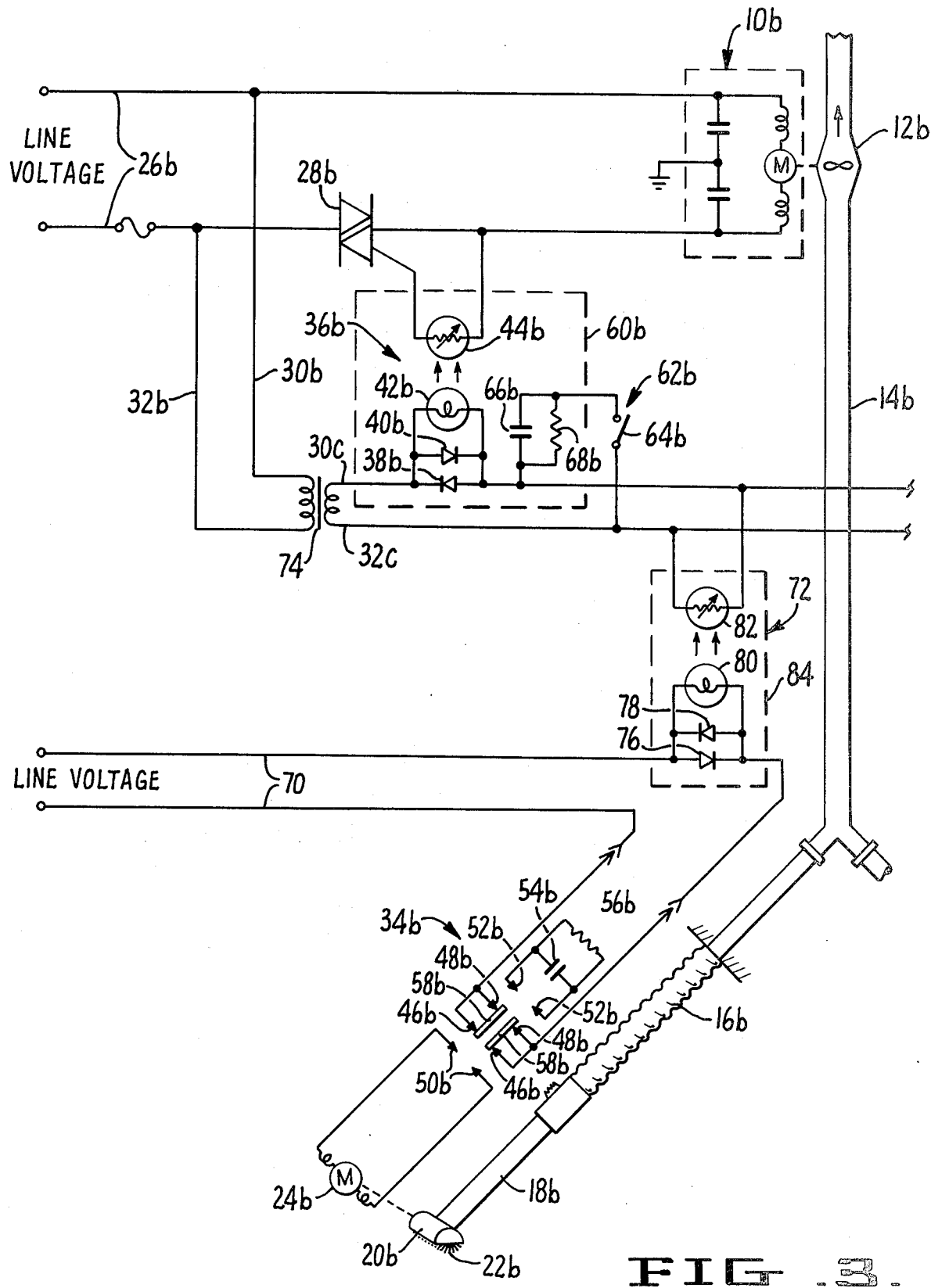
FIG. 3 is a diagrammatic representation of a central vacuum cleaner system, schematically showing the elements of the electrical control system in an embodiment wherein separate power supply sources are provided for the central blower and remote agitator.

The FIG. 3 embodiment is similar to that of FIG. 2, with the exception that the A.C. suction motor and the agitator motor are independently connected to separate sources of electrical power and an additional photo sensing circuit is provided to sense the flow of current in the leads extending to the source of electrical power for the agitator motor.

The components of the FIG. 3 embodiment corresponding to those of the FIG. 2 embodiment are designated by numerals like those used on the FIG. 2 embodiment, followed by the subscript "b". These corresponding components of the FIG. 3 embodiment are as follows: A.C. air suction motor 10b; air turbine 12b; vacuum airway 14b; flexible hose 16b; cleaning wand 18b; nozzle 20b; brush 22b; agitator motor 24b; power input lines 26b; triac switch 28b; conductors 30b and 32b; switch 34b; photo sensing means 36b; load diodes 38b and 40b; electric light 42b; photo cell 44b; contacts 46b, 48b, 50b and 52b; load capacitor 54b; discharge resistor 56b; slide contacts 58b; printed circuit board 60b; bypass switch circuitry 62b; switch 64b; load capacitor 66b; and, discharge resistor 68b.

The principal differences between the FIGS. 2 and 3 embodiments are that (1) separate power input lines 70 are provided for supplying power to the motor 24b through the switch 34b; (2) the conductors 30b and 32b are not connected to the switch 34b or the motor 24b; and (3) photo sensing means 72 is coupled between the power input lines 70 and reduced voltage extensions of the conductors 30 and 32, said extensions being designated 30c and 32c, respectively. Reduced voltage is supplied from the conductors 30b and 32b to the extensions 30c and 32c by a step-down transformer 74. Typically, the power input lines 26b would supply power at 115 or 230 volts and the step-down transformer 74 would function to step the voltage across the extensions 30c and 32c to 24 volts.

The power input lines 70 would typically be plugged into a conventional 115 volt receptacle in the room in which the flexible hose 16b and cleaning wand 18b are being used. Although only one photo sensing means 72 is illustrated in FIG. 3, it should be understood that a corresponding photo sensing means would be provided in each room to which the central vacuum cleaning system extends and that each such means would be coupled to the extensions 30c and 32c in a manner corresponding to that shown for the means 72 in FIG. 3. The photo sensing means 72 is similar to the means 36b and comprises: a pair of oppositely directed load diodes 76, 78 connected in parallel to one another and across one of the lines 70 to create a voltage drop thereacross; an electric light 80 connected in parallel with the diodes 76 and 78; and, photo cell 82 connected across the extension 32 in light intercepting relationship to the light 80. The components of the photo sensing means 70 are miniaturized and mounted on a printed circuit board 84.

Insofar as the operator is concerned, the FIG. 3 embodiment operates identically to the FIG. 2 embodiment, with the exception that the power input lines 70 must be connected to a separate source of power, such as a conventional 115 volt wall receptacle. Once the input lines 70 are so connected, the switch 34b may be employed to selectively turn off the vacuum cleaning system or energize one or both of the motors 10b and 24b. The bypass switch circuitry 62b of the FIG. 3 embodiment operates in a manner identical to the circuitry 62 of the FIG. 2 embodiment.

From a functional standpoint, when current is flowing through the input lines 70, the photo sensing means 72 is energized and, in turn, energizes the photo sensing means 36b to trigger the triac switch 28b and activate the suction motor 10b.

As compared to the FIG. 2 embodiment, the FIG. 3 embodiment has the advantage that line voltage wiring does not need to extend to the individual vacuum cleaning receptacles for the central vacuum cleaning system. Rather, only the low voltage extensions 30c and 32c need extend to such locations. This is beneficial because inexpensive Class 2 circuitry can be used for the low voltage extensions.

CONCLUSION

From the foregoing detailed description, it is believed apparent that the present invention enables the attainment of the objects inititally set forth herein. It should be understood, however, that the invention is not intended to be limited to the specifics of these embodiments, but rather is defined by the accompanying claims.

What is claimed is:

1. A power transmission and control system for a central vacuum cleaning system having a centrally located electrical vacuum motor and at least one remote cleaning unit to be coupled to the vacuum system at a location remote from the vacuum motor and carrying an agitator brush driven by a motor, said system comprising: a first conductor coupled to a power transmission line and extending to said location remote from the vacuum motor; a second conductor coupled between a source of electrical power and the remote cleaning unit and extending in close proximity to said first conductor at said location remote from the vacuum motor; a current sensor coupled between said first and second conductors at said remote location without electrically connecting said conductors to one another, said sensor altering current in the first conductor in response to the flow of current through the second conductor; power transmission line extensions connecting the centrally located electrical vacuum motor to the power transmission line an electrically responsive power switch interposed in said power transmission line extensions; and means coupling said switch to said current sensor through the first conductor to activate said switch responsive to altered current in the first conductor.

2. A power transmission and control system according to claim 1 wherein the current sensor comprises: a voltage drop load connected in the second conductor; an electric light connected across said voltage drop load; and, a photo cell interposed in the first conductor and disposed in light intercepting relationship to the light.

3. A power transmission and control system for a central vacuum cleaning system having a centrally located electrical vacuum motor and at least one remote cleaning unit to be coupled to the vacuum system at a location remote from the vacuum motor and carrying an electrical load, said system comprising: a first conductor coupled to a power transmission line and extending to said location remote from the vacuum motor; a second conductor coupled between a source of electrical power and the electrical load of the remote cleaning unit and extending in close proximity to said first conductor at said location remote from the vacuum motor; power transmission line extensions connecting the centrally located electrical vacuum motor to the power transmission line; first switching means interposed in the second conductor at the location of the remote cleaning unit for controlling the flow of current to the electrical load; sensing means coupled between the first and second conductors at said location remote from the vacuum motor to detect the flow of electrical current through said second conductor and energize the first conductor in response thereto; and, actuating means responsive to energizing of the first conductor to actuate said first switching means in response to the detection of electrical current in the second conductor.

* * * * *